United States Patent [19]

Dick

[11] 4,216,840
[45] Aug. 12, 1980

[54] HIGH CLEARANCE VEHICLE DRIVE ARRANGEMENT

[76] Inventor: Virgil Dick, Rte. 2, Otterville, Mo. 65348

[21] Appl. No.: 967,278

[22] Filed: Dec. 7, 1978

[51] Int. Cl.$^2$ .................. B60K 17/06; B60K 17/28
[52] U.S. Cl. .................. 180/70 R; 180/53 D; 180/900; 74/15.69
[58] Field of Search .................. 180/70 R, 75, 53 R, 180/53 D, 53 A, 6.2, 900

[56] References Cited

U.S. PATENT DOCUMENTS

| 803,361 | 10/1905 | Reed | 180/70 R |
|---|---|---|---|
| 1,349,997 | 8/1920 | Allen | 180/75 |
| 1,426,699 | 8/1922 | Zieche | 180/1 F |
| 1,760,932 | 6/1930 | Witry | 180/75 |
| 2,311,393 | 2/1943 | Honeywell | 180/1 F |
| 2,443,804 | 6/1948 | Sauer | 180/70 R |
| 2,572,115 | 10/1951 | Crump | 180/53 R |
| 2,917,121 | 12/1959 | Hutter | 180/43 R |
| 2,994,392 | 8/1961 | Kosman | 180/75 |
| 3,006,428 | 10/1961 | Westmont | 180/70 R |
| 3,146,843 | 9/1964 | Hinson | 180/75 |
| 3,515,313 | 6/1970 | Siems | 180/6.2 |
| 3,689,101 | 9/1972 | Spence | 180/43 R |
| 3,762,490 | 10/1973 | Molzahn | 180/70 R |
| 3,788,416 | 1/1974 | Sorenson | 180/27 |
| 3,796,275 | 3/1974 | Bouyer | 180/6.2 |

*Primary Examiner*—John P. Silverstrim
*Attorney, Agent, or Firm*—Fishburn, Gold & Litman

[57] ABSTRACT

A drive arrangement for a high clearance vehicle comprising an elongate, mobile frame having depending, laterally spaced struts at front and rear ends mounting front and rear wheels respectively. A ring gear is fixed relatively to each rear drive wheel and a speed reducer for each rear drive wheel is carried by the frame adjacent a respective drive wheel. Each speed reducer has an input shaft and an output shaft with a gear pinion in driving engagement with a respective ring gear at an upper portion thereof. An engine and transmission are mounted on the frame and have a driven output shaft operatively connected to the respective speed reduces by pulleys respectively on the driven output shaft and the speed reducer input shafts for driving the speed reducer and the rear drive wheels in response to operation of the engine.

2 Claims, 6 Drawing Figures

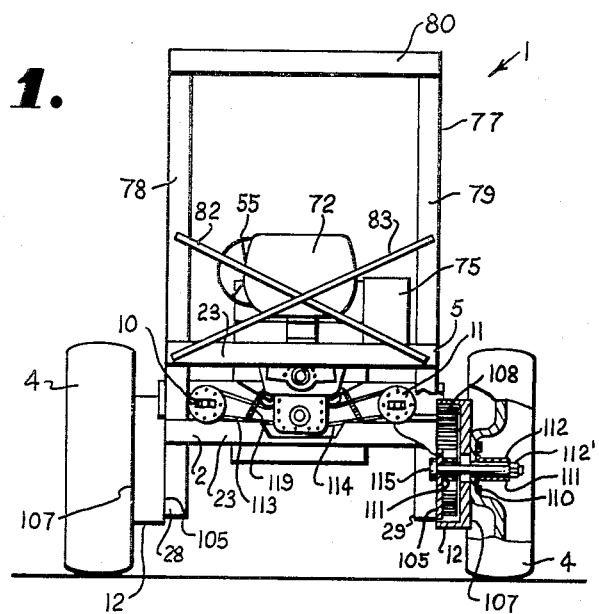

HIGH CLEARANCE VEHICLE DRIVE ARRANGEMENT

This invention relates to a drive arrangement permitting movement of high clearance vehicle over low lying brush, ruts and hummocks, earth and more specifically, to a drive arrangement of particularly narrow end aspect.

High clearance vehicles are especially useful for agricultural operations such as carrying spray equipment, light plowing and general purpose use. Sufficient clearance is necessary between the frame and the ground in order to leave crops undisturbed as the vehicle is driven over rows thereof and so that the vehicle undercarriage does not become hung on brush, small earth ridges, tree stumps or the like. In marshy conditions, high clearance often permits a vehicle to drive through shallow water and mud without flooding the engine and soaking the driver.

The principal objects of the present invention are: to provide a high clearance vehicle drive arrangement of narrow end aspect for clearance of low lying brush and earth obstacles; to provide such a vehicle drive arrangement having drive means offset upwardly from axial connections of powered or traction wheels; to provide such a vehicle drive arrangement having belt means which are adjustable in tension and slippage for differential action during turning of the vehicle; to provide such a vehicle drive arrangement having individual traction or drive wheels ultimately driven by gear and shaft arrangements in intermeshing engaging contact therewith; and to provide such a vehicle drive arrangement which is sturdy and efficient in use and particularly well adapted for the intended purpose.

Other objects and advantages of this invention will become apparent from the following description taken in connection with the accompanying drawings wherein are set forth, by way of illustration and example, certain embodiments of this invention.

FIG. 1 is a rear elevational view of a high clearance vehicle having a drive arrangement embodying the present invention.

FIG. 2 is a plan view of the high clearance vehicle.

FIG. 3 is a front elevational view of the high clearance vehicle.

Figure 4:
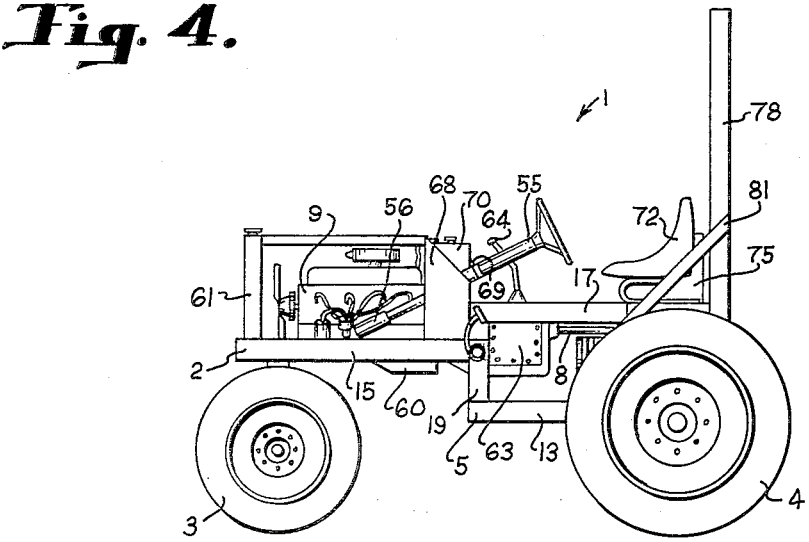
FIG. 4 is a side elevational view of the high clearance vehicle.

Referring to the drawings in more detail:

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1, FIG. 4, generally indicates a high clearance vehicle having a horizontally disposed main frame 2, supported relatively high above the ground by front steering wheels 3 and rear traction or drive wheels 4. A frame rear portion 5, FIG. 5, carries a belt drive arrangement including a main pulley 7 rotated by a driven output shaft 8 from an engine 9 and speed reducer means such as gear drive cases 10 and 11 for each drive wheel 4. The gear drive cases 10 and 11 are driven by belts from the main pulley 7 and have shafts and pinions intermeshingly engaged with ring gears 12 fixed relatively to each drive wheel 4 for powered rotation thereof.

Figure 6:
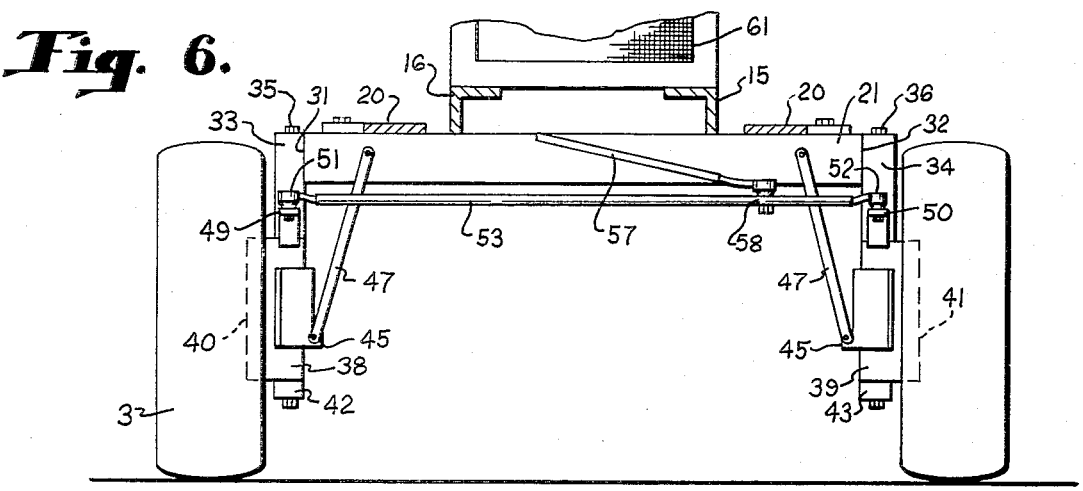
FIG. 6 is a fragmentary, transverse, sectional view taken along line 6—6, FIG. 2, and showing details of the front end steering means of the high clearance vehicle.

In the illustrated example, the main frame 2 includes parallel, elongate, front support beams 15 and 16 connected to parallel, elongate, upper rear support beams 17 and 18 and lower rear support beams 13 and 14 by intermediately positioned, vertical connector beams 19. A front axle beam 21, FIG. 6, is secured transversely and below the forward portions of the front support beams 15 and 16 and braced by arms 20 with the front steering wheels 3 mounted to the axle beam 21 as described below. Extending transversely of the upper rear support beams 17 and 18 are the lower rear support beams 13 and 14 are rear upper and lower elongate beam members 23 and front upper and lower elongate beam members 24 respectively having opposite ends secured to spaced, rear struts 26, 27, 28 and 29 which are mounted to the traction or drive wheels 4 as described below. A rear beam 30 extends across the ends of the lower rear support beams 13 and 14 for use in towing implements or the like.

The front axle beam 21 has opposite ends 31 and 32 rigidly secured to elongate front struts 33 and 34 having king pins 35 and 36 extended therethrough and connected to respective hub mounts 38 and 39 of respective wheel hubs 40 and 41. End collars 42 and 43 are sleeved on the king pins 35 and 36 below the hub mounts 38 and 39. An ear 45 extends outwardly of each hub mount 38 and 39 and receives an end of a brace 47 connected at an opposite end to the front axle beam 21 for stiffening the king pin assemblies.

Tie rod attachment arms 49 and 50 extend upwardly and then rearwardly from portions of the hub mounts 38 and 39 for connection to opposite ends 51 and 52 of a tie rod 53. A steering wheel 55 is operably connected via a steering gear box 56 to a steering arm 57 connected to the tie rod 53 at 58 for pivotal movement of the front wheels 3.

The engine 9 is mounted between the front support beams 15 and 16 and an oil pan or sump 60 extends slightly therebelow. A radiator 61 is positioned in front of the engine 9 and between the front support beams 15 and 16. A transmission 63 extends rearwardly from the engine 9 and includes a shift lever 64 extending upwardly into proximity to the steering wheel 55 and clutch and brake pedals 65 and 66. A dash board 68 is located between the front support beams 15 and 16 rearward of the engine 9 and, in the illustrated example, has a manual throttle 69 connected thereto and a mount for a battery 70. An operator's seat 72 is mounted between the upper rear support beams 17 and 18 and foot rest 73 and 74 extend outwardly of the frame 2 adjacent each of the connector beams 19 for driving comfort, the foot rests 73 having the clutch and brake pedals 65 and 66 mounted thereon. A gas tank 75 is mounted beside the operator's seat 72 and has suitable lines or conduits extending to the engine 9.

A roll bar structure 77 for providing protection in the event of upset is mounted upwardly of the operator's seat 72 and includes vertical members 78 and 79 respectively connected to the rear struts 28 and 29 with an upper transverse member 80 extending therebetween for structural rigidity. Braces 81 and cross braces 82, and 83 provide additional rigidity for the roll bar structure 77.

Figure 5:
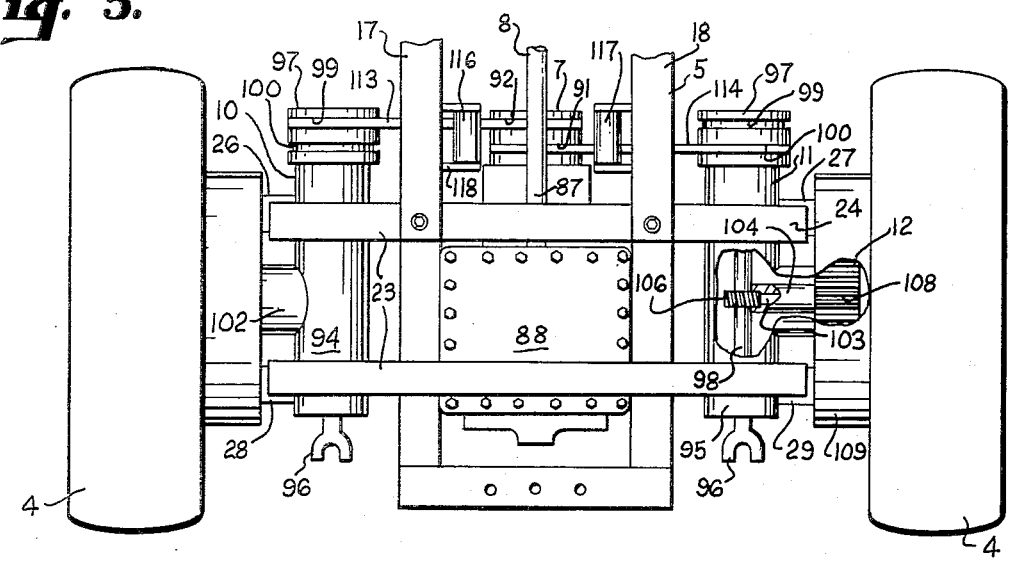
FIG. 5 is a fragmentary view of the drive arrangement of the high clearance vehicle and having portions removed therefrom for purposes of illustration.

The main driven output shaft 8 extends rearwardly from the transmission 63 and, in the illustrated example, FIG. 5, is connected, as by buttwelding, to an input shaft 87 of a transfer case 88 mounted between the lower rear support beams 13 and 14 and the upper rear support beams 17 and 18. The transfer case 88 contains an internal arrangement of shafts, gears and bearings which suitably reduce rotational speed transmit torque from the main drive shaft 8 downwardly and forwardly to the main drive pulley 7 having, for example, separate belt grooves 91 and 92. Speed reducer means such as gear drive cases 94 and 95 are respectively mounted opposite ends of upper and lower transverse beam members 23 and 24 and laterally of the transfer case 88 for transfering torque from the main driven output shaft 8 to the traction or drive wheels 4. Each of the gear drive cases 94 and 95 extends longitudinally relative to the frame 1 and includes input shaft 98 extending longitudinally therethrough with a forward end having a pulley 97 mounted thereon and a rear end having a clevis 96 thereon for connection to auxiliary implements (not shown). Each pulley 97 includes belt grooves 99 and 100, at least one of which is laterally aligned with one of the main drive pulley belt grooves 91 and 92 for connection of a belt therebetween, described below.

Each first shaft 98 includes a suitable gear means mounted thereon for providing desired speed reduction and low-noise running and having rotational connection to gear means an output shaft 103 extending generally at a right angle to the input shaft 98 and between the input shaft 98 and the drive wheel ring gears 12. The output shaft 103 extends through a housing 102 extending outwardly from each case 94 and 95 and is sleeved within a bearing block 104 inside the housing 102 to prevent longitudinal sliding. In the illustrated example, one end of the output shaft 103 is connected to a gear, such as a worm gear 106, in intermeshing engagement with the gear means of the input shaft 98. The outer end of the output shaft 103 is connected to suitable gear means, such as a pinion gear 108, in intermeshing engagement with the ring gear 12 affixed relative to the adjacent traction or drive wheel 4. In the illustrated example, each ring gear 12 is rotatably connected to an inboard plate member 105 by an outboard plate member 107 secured to an outboard circumferential margin of the ring gear 12. The inboard plate members 105 are respectively secured to the rear struts, such as strut pairs 26 and 28 and strut pairs 27 and 29. An axle 112 extends through the axial center of the inboard plate member 105 and has a head 115 thereon preventing outward movement. A suitable hub and rigid support arrangement 111 is secured to the inboard plate member 105 and extends to the outboard plate member 104 for non-rotatively and rigidly receiving the axle 112 therethrough. A hub and rotative bearing arrangement 111' on the outboard plate member 107 fits over an outboard end of the axle 112 and against the hub and rigid support arrangement 111 for relative rotation of the outboard plate member 107 and the attached ring gear 12 on the axle 112. An axle nut 112' mounted on the outboard end of the axle 112 retains the ring gear 12 and outboard plate member 107 mounted on the axle 12. In turn, the drive wheel 4 is mounted to the outboard plate member 107, as by wheel nuts 110.

The exemplary ring gear 12 is an internal gear having teeth open to the axial center of the gear and the pinion gear 108 on the gear drive output shaft 103 extends through an opening in the upper portion of the inboard plate members 105 and into driving engagement with the ring gear 12.

Belts 113 and 114 connect the main drive output pulley 7 to each of the pulleys 97 and run in respective grooves, such as grooves 91 and 99 and grooves 92 and 100. Tensioners 116 and 117 are provided for the respective belts 113 and 114 and each having an arm 118 connected to a spring 119 extending from a rear beam member 24. The respective belt tensioners 116 and 117 maintain tension on the belts in response to differential action caused by turning of the vehicle 1.

During operation of the vehicle drive arrangement, movement of the main driven output shaft 8 is transferred downwardly and forwardly through the transfer case 88 to effect rotation of the main driven output pulley 7 and drive pulleys 97 of the respective speed reducing gear drive cases 10 and 11 to cause rotation of respective input shafts 98. By means of the internal gearing arrangement of the drive cases 10 and 11, the output shaft 103 rotates to drive the pinion gear 108 and the ring gear 12, thereby driving each wheel 4.

It is to be understood that one form of this invention has been illustrated and described, it is not to be limited to this specific form or arrangement of parts herein described and shown, except as so far in such limitations are included in the following claims.

What I claim and desire to secure by Letters Patent is:

1. A drive arrangement for a high clearance vehicle comprising:
   (a) an elongate mobile frame having depending laterally spaced struts at front and rear portions and means on lower portions of the front and rear struts for rotatively mounting front wheels and rear drive wheels respectively;
   (b) respective ring gears fixed relatively to each of said drive wheels;
   (c) a speed reducer means for each of said rear drive wheels carried by the frame adjacent the respective rear drive wheels and having respective input shafts and speed reducer output shafts with gear pinions in driving engagement with respective said ring gears at upper portions thereof;
   (d) an engine and transmission mounted on said frame and having a driven output shaft; and
   (e) pulleys on said driven output shaft and said input shafts operatively connected by belts for driving the speed reducer means and rear drive wheels in response to operation of the engine;
   (f) said transmission comprising change speed transmission means driven by said engine, a drive shaft extending from said change speed transmission means, and a speed reducing transfer case having an input shaft connected to said drive shaft, said driven output shaft extending forwardly from said transfer case.

2. A drive arrangement for a high clearance vehicle comprising:
   (a) an elongate, horizontally extending, mobile frame having a longitudinally extending axis and depending laterally spaced struts at front and rear portions and means on lower portions of the front and rear struts for rotatively mounting front wheels and transversely spaced rear drive wheels respectively;

(b) respective ring gears fixed relatively to each of said drive wheels;

(c) a speed reducer means for each of said rear drive wheels, said speed reducer means being horizontally mounted to the frame adjacent the respective rear drive wheels and spaced apart transversely and having respective longitudinally extending input shafts and speed reducer output shafts extending laterally therefrom and toward said rear drive wheels with gear pinions in driving engagement with respective said ring gears at upper portions thereof;

(d) an engine and transmission mounted on said frame and having a longitudinally extending driven output shaft; and (e) pulleys on said driven output shaft and said input shafts with said pulleys respectively mounted for rotation in a vertical plane extending transverse to the axis of said mobile frame and operatively connected by belts extending across said mobile frame in opposite directions and driving the speed reducer means and rear drive wheels in response to operation of the engine; said transmission comprising change speed transmission means driven by said engine, a drive shaft extending from said change speed transmission means, and a speed reducing transfer case having an input shaft connected to said drive shaft, said driven output shaft extending forwardly from said transfer case.

* * * * *